United States Patent
Liu et al.

(10) Patent No.: US 9,428,669 B2
(45) Date of Patent: Aug. 30, 2016

(54) TWO-PART POLYURETHANES BASED ON HYPERBRANCHED POLYMERS

(71) Applicant: SIKA TECHNOLOGY AG, Baar (CH)

(72) Inventors: Shuyuan Liu, Birmingham (GB); Neil Carter, Ainsdale (GB); Len Daniels, Leyland (GB)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 13/852,547

(22) Filed: Mar. 28, 2013

(65) Prior Publication Data

US 2013/0210998 A1    Aug. 15, 2013

Related U.S. Application Data

(63) Continuation of application No. PCT/EP2011/066968, filed on Sep. 29, 2011.

(30) Foreign Application Priority Data

Sep. 29, 2010  (EP) .................................... 10181891

(51) Int. Cl.
C08G 18/62    (2006.01)
C08F 2/38     (2006.01)
C09D 175/08   (2006.01)

(52) U.S. Cl.
CPC .......... *C09D 175/08* (2013.01); *C08G 18/6229* (2013.01); *C08G 18/6254* (2013.01)

(58) Field of Classification Search
CPC .. C09D 175/08; C09D 175/04; C09D 175/14; C09D 175/00; C08L 75/04; C08L 75/00; C08L 75/14; C08G 18/6229; C08G 18/6254; C08G 18/62; C08F 2/38
USPC ....................................... 524/590; 427/385.5
See application file for complete search history.

(56) References Cited

U.S. PATENT DOCUMENTS

| 4,694,054 | A | 9/1987 | Janowicz |
| 4,880,889 | A | 11/1989 | Jung et al. |
| 5,093,408 | A | 3/1992 | Jung et al. |
| 5,115,064 | A | 5/1992 | Jung et al. |
| 5,767,211 | A | 6/1998 | Guan |
| 5,985,998 | A * | 11/1999 | Sommerfeld et al. .......... 525/72 |
| 6,228,919 | B1 | 5/2001 | Sommerfeld |
| 2003/0018124 | A1 | 1/2003 | Barsotti et al. |
| 2004/0072955 | A1 | 4/2004 | Barsotti et al. |
| 2005/0054767 | A1* | 3/2005 | Darling et al. ................. 524/589 |

FOREIGN PATENT DOCUMENTS

| JP | 5093003 B2 | 9/2012 |
| WO | WO 98/04603 A1 | 2/1998 |
| WO | WO 03/006520 A1 | 1/2009 |

OTHER PUBLICATIONS

Bakac et al., "Unimolecular and Bimolecular Homolytic Reactions of Organochromium and Organocobalt Complexes. Kinetics and Equilibria" J. Am. Chem. Soc., (1984), vol. 106, No. 18, pp. 5197-5202.
Guan, "Control of Polymer Topology through Transition-Metal Catalysis: Synthesis of Hyperbranched Polymers by Cobalt-Mediated Free Radical Polymerization" J. Am. Chem. Soc., (2002), vol. 124, No. 20, pp. 5616-5617.
International Search Report (PCT/ISA/210) issued on Jan. 31, 2012, by the European Patent Office as the International Searching Authority for International Application No. PCT/EP2011/066968.
Written Opinion (PCT/ISA/237) issued on Jan. 31, 2012, by the European Patent Office as the International Searching Authority for International Application No. PCT/EP2011/066968.
Japanese Office Action issued in corresponding Japanese Patent Application No. 2013-530730 mailed Jul. 21, 2015.
European Office Action issued in corresponding European Patent Application No. 11763668.8-1301 dated Sep. 25, 2015 (5 pages).
Office Action (Decision of Final Rejection) issued on Mar. 8, 2016, by the Japanese Patent Office in corresponding Japanese Patent Application No. 2013-530730, and an English Translation of the Office Action. (7 pages).

* cited by examiner

*Primary Examiner* — Rabon Sergent
*Assistant Examiner* — Deve E Valdez
(74) *Attorney, Agent, or Firm* — Buchanan Ingersoll & Rooney PC

(57) ABSTRACT

A two-part polyurethane composition including a first pack and a second pack. The first pack includes at least one hyperbranched copolymer having OH groups and which is prepared from at least one or more monomer(s) having at least two unsaturated C—C bonds and one or more monomer(s) having one unsaturated C—C bond and one hydroxyl group in the presence of a cobalt (II) complex. The second pack comprises at least one polyisocyanate. Disclosed is a two-part polyurethane composition which has low viscosity, long pot life, fast cure, excellent weathering and UV resistance and which is suitable for use as a coating.

30 Claims, No Drawings

TWO-PART POLYURETHANES BASED ON HYPERBRANCHED POLYMERS

RELATED APPLICATION(S)

This application claims priority as a continuation application under 35 U.S.C. §120 to PCT/EP2011/066968, which was filed as an International Application on Sep. 29, 2011 designating the U.S., and which claims priority to European Application No. 10181891.2 filed in Europe on Sep. 29, 2010. The entire contents of these applications are hereby incorporated by reference in their entireties.

FIELD

The disclosure relates to two-part polyurethane compositions.

BACKGROUND INFORMATION

Two-part polyurethane is a technology which can be applied to a variety of applications. Two-part polyurethane compositions in which one part comprises polyol(s) and the second part comprises polyisocyanate(s) can be employed. As polyols a wide range of molecules can be employed, such as polyether polyols, polyester polyols and acrylic polyols. These two-part polyurethanes are fast curing. Furthermore, they have a short pot-life, which can be problematic for certain applications, for example, for applications of a larger area of application. Furthermore, they can have a rather high viscosity after mixing. In order to reduce the viscosity, additional solvent can be used. However, this contravenes the trend of more stringent regulations in the market concerning a reduction of solvents or VOC (Volatile Organic Compounds) which is based on ecological and ecotoxic reasons.

Hyperbranched polymers are a recently found class of polymers and can be obtained from different monomers having unsaturated C—C bonds. Hyperbranched polymers have a different structure than traditional polymers, for example, polyols, which are either linear or only slightly branched. Hyperbranched polymers exhibit a branched structure. Hyperbranched polymers can be made through one-pot synthesis and therefore can be cost effective.

U.S. Pat. No. 4,880,889 discloses a preparation of hydroxyl functional acrylic polymer with monomers having more than one C—C double bond using a mercapto compound as chain stopper, being effectively a chain transfer agent for the radical polymerization process.

U.S. Pat. No. 5,767,211 discloses the preparation of (meth) acrylate functional hyperbranched polymers used for photopolymerization using a cobalt (II) complex as chain transfer catalyst.

International Publication No. WO 98/04603 A1 discloses a thermoformable cast being directly formed by the polymerization of different (meth)acrylic monomers in the presence of cobalt (II) complexes, for example, of a bis(borondifluorodimethylglyoximate) cobaltate (II) complex.

The preparation of cobalt (II) complexes, for example, of cobalt (II) oxime complexes, and their use as chain transfer catalysts for free radical polymerization are disclosed in U.S. Pat. No. 4,694,054, A. Bakac et al., *J. Am. Chem. Soc.* 1984, 106, 5197-5202 and A. Bakac et al., *J. Am. Chem. Soc.* 2002, 124, 5616-5617.

U.S. Pat. No. 5,115,064 discloses isocycanate functional acrylic copolymers being prepared from the free radical polymerization of isocyanatoalkyl esters of (meth)acrylic acid in the presence of mercapto compounds as regulators, which then in a second step may be crosslinked by polyols.

SUMMARY

According to an exemplary aspect, disclosed is a two-part polyurethane composition, comprising a first pack (C1) and a second pack (C2), wherein the first pack (C1) comprises: at least one hyperbranched copolymer (HBC) having OH groups, wherein the at least one hyperbranched copolymer is prepared from at least a) one or more monomer(s) having at least two unsaturated C—C bonds (M2), b) one or more monomer(s) having one unsaturated C—C bond and one hydroxyl group (MH), in the presence of a cobalt (II) complex (CC), and the second pack (C2) comprises at least one polyisocyanate (PI).

According to an exemplary aspect, disclosed is a method of forming a coating, the method comprising: i) mixing the content of the first pack (C1) and the content of the second pack (C2) of an exemplary two-part polyurethane composition, resulting in a mixed two-part polyurethane composition; ii) applying the mixed two-part polyurethane composition onto a substrate (S); and iii) curing the mixed two-part polyurethane composition.

According to an exemplary aspect, disclosed is a coating obtained from an exemplary method of forming a coating.

According to an exemplary aspect, disclosed is a reaction product obtained from mixing the content of the first pack (C1) with the content of the second pack (C2) of an exemplary two-part polyurethane composition.

DETAILED DESCRIPTION

According to an exemplary aspect, provided is a two-part polyurethane composition which has an extended pot-life on the one hand but having a fast curing behavior on the other hand and which shows excellent UV stability.

For example, disclosed is an exemplary two-part composition that after mixing has a relatively low viscosity. For example, this can lead to either using less solvent or to an increase in the amount of fillers and still offer an acceptable workability.

An exemplary two-part composition can have, in comparison to comparative two-part compositions, an extend pot-life allowing for large area applications combined with a very fast cure. For example, this can be exceptional as fast curing can normally correlate also to short pot-life. An exemplary two-part polyurethane composition can be applied for a longer time on a surface. After the pot-life the development of strength can be very rapid and high green strength can be obtained after a very short time, for example, under heated conditions. This combination can be suitable for application of the two-part polyurethane composition as a coating or an adhesive, for example, in applications where the composition is applied on larger objects. It can also be beneficial to users who apply and cure the coating in a production line such as automotive OEM coating application where the production time can be shortened and the heating energy can be reduced.

An exemplary two-part polyurethane composition has an excellent UV stability which is not the case if a hyperbranched polyol being prepared by radical polymerization of the corresponding monomers using mercapto compounds as chain transfer agent would be used in the formulation instead.

An exemplary two-part polyurethane composition has low viscosity, long pot life, fast cure, excellent weathering and UV resistance, flexibility and adhesion and can be suitable for the use as coating.

In an exemplary embodiment, a reaction product having NCO groups can be easily prepared from the two-part polyurethane composition and which can have desirable properties and can be applicable in the preparation of polyurethanes with very high mechanical properties.

According to an exemplary aspect, disclosed is a two-part polyurethane composition. This two-part composition includes a first pack (C1) and a second pack (C2). The first pack (C1) comprises at least one hyperbranched copolymer (HBC) having OH groups and which is prepared from at least:
a) one or more monomer(s) having at least two unsaturated C—C bonds (M2),
b) one or more monomer(s) having one unsaturated C—C bond and one hydroxyl group (MH),
in the presence of a cobalt (II) complex (CC). The second pack (C2) comprises at least one polyisocyanate (PI).

The term "polyisocyanate" includes compounds having two or more isocyanate groups, independently of whether they are monomeric diisocyanates, oligomeric polyisocyanates, or polymers containing isocyanate groups and having a relatively high molecular weight (for example, larger than 1000 g/mol).

The term "polymer" includes, on the one hand, a collective of macromolecules which, while being chemically uniform, nevertheless differ in respect of degree of polymerization, molar mass, and chain length, and have been prepared by a polymerization reaction (chain-growth addition polymerization, polyaddition, polycondensation, radical polymerization). The term also includes derivatives of such a collective of macromolecules from polymerization reactions, in other words compounds which have been obtained by means of reactions, such as additions or substitutions, for example, of functional groups on existing macromolecules, and which may be chemically uniform or chemically non-uniform. The term also includes prepolymers, by which are meant reactive oligomeric pre-adducts whose functional groups take part in the construction of macromolecules.

Substance names beginning with "poly", such as polyisocyanate or polyol, include substances which, in a formal sense, contain two or more of the functional groups which occur in their name per molecule.

"Room temperature" means a temperature of 23° C.

The terms "two component" and "two-part" refer to a chemically reactive system which comprises individual reactive ingredients which are stored in two separate compartments, for example, packs, in order to mitigate or avoid the spontaneous reaction between said reactive ingredients.

In the present document, the bold-labelling of references such as C1, C2, HBC, CC, PI, M1, M1', M2, M2', MH, MH', IN, PI-O, PI-M, PUP, HBC-NCO, S or the like are used only for better reading comprehension and identification.

In an exemplary embodiment, the first pack (C1) (first component) comprises at least one hyperbranched copolymer (HBC) having OH groups. Said hyperbranched copolymer (HBC) having OH groups is prepared from at least one or more monomer(s) having at least two unsaturated C—C bonds (M2) and one or more monomer(s) having one unsaturated C—C bond and one hydroxyl group (MH) in the presence of a cobalt (II) complex (CC).

The presence of at least two different types of monomers for the production of the hyperbranched copolymer (HPC) is desirable. For example, at least one (meth)acrylic ester and at least one hydroxyl-functional (meth)acrylic ester are present.

Monomer(s) having at least two unsaturated C—C bonds (M2) are, in an exemplary embodiment, di(meth)acrylates which are (poly)alkylene or (poly)oxyalkylene bridged di(meth)acrylates.

For example, di(meth)acrylate is of formula (I-a) or (I-b):

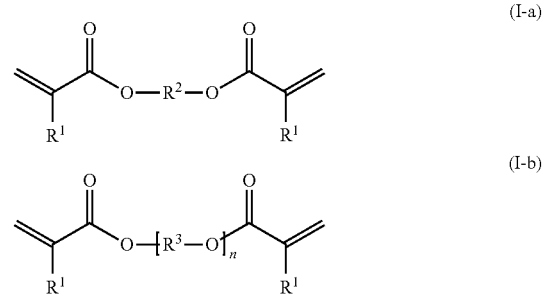

wherein $R^1$ is H or a methyl group, for example, a methyl group;

$R^2$ is a linear or branched alkylene group with 2 to 30 carbon atoms, for example, 2 to 15 carbon atoms, for example, an ethylene, propylene, isopropylene or butylene group;

$R^3$ is a linear or branched alkylene group with 2 to 6 carbon atoms and n is an integer from 2 to 6.

In an exemplary embodiment, the alkylene group $R^2$ has some aromatic moieties in the backbone and the di(meth)acrylate is, for example, of the formula (I-a'):

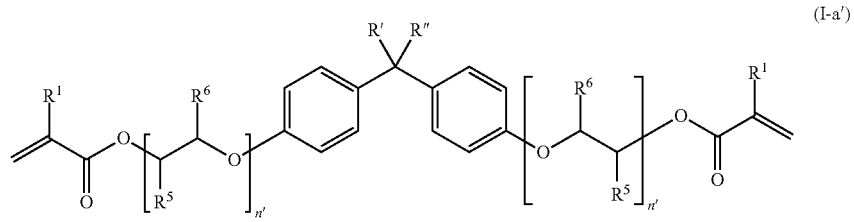

wherein R' and R" are H or $CH_3$, $R^5$ and $R^6$ are independently from each other H, $CH_3$ or $CH_2CH_3$, n' is a value of 1 up to 6 and $R^1$ is as defined for formula (I-a), respectively (I-b).

In an exemplary embodiment, such monomers having at least two unsaturated C—C bonds (M2) are bis(meth)acrylamides of diamines of the formula

$NH_2$—$R^2$—$NH_2$ or

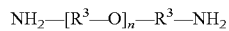

$NH_2$—[$R^3$—O]$_n$—$R^3$—$NH_2$ wherein $R^2$, $R^3$ and n are as defined for formula (I-a), respectively (I-b).

In an exemplary embodiment, such monomers having at least two unsaturated C—C bonds (M2) are monomers having three or more, for example, three or four, unsaturated C—C bonds. Examples of such monomers esters of (meth)acrylic acids and triol or tetrol, such as trimethylolpropane tri(meth)acrylate, trimethylolethane tri(meth)acrylate, glycerol tri(meth)acrylate or pentaerythritol tri(meth)acrylate or pentaerythritol tetra(meth)acrylate.

The monomer(s) having at least two unsaturated C—C bonds (M2) include two unsaturated C—C bonds.

For example, monomer(s) having one unsaturated C—C bond and one hydroxyl group (MH) (for example, hydroxyalkyl(meth)acrylates) can be used. For example, such hydroxyalkyl(meth)acrylates are the ones of formula (II)

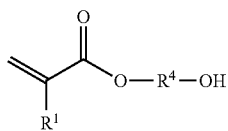

(II)

wherein $R^1$ is H or a methyl group, for example, a methyl group, and $R^4$ is a linear or branched alkylene group of 1 to 10 carbon atoms, for example, a methylene or ethylene or propylene or butylene group.

Exemplary monomers (MH) include, for example, hydroxyethylacrylate (HEA), hydroxyethylmethacrylate, (HEMA), hydroxypropylacrylate (HPA), hydroxy-propylmethacrylate (HPMA), hydroxybutylacrylate (HBA) or hydroxybutylmethacrylate (HBMA).

In an exemplary embodiment, monomer(s) having one unsaturated C—C bond and two or more hydroxyl groups can be used as additional monomers. Examples of such monomers are monoesters of (meth)acrylic acid and a polyol, such as (meth)acrylic monoester of glycerol or trimethylolpropane or trimethylolethane or pentaerythritol.

In an exemplary embodiment, monomer(s) having two or more unsaturated C—C bonds and at least one hydroxyl group can be used as additional monomers. Examples for such monomers are diesters of (meth)acrylic acid and a triol or a tetrol such as trimethylolpropane di(meth)acrylate, trimethylolethane di(meth)acrylate, glycerol di(meth)acrylate or pentaerythritol di(meth)acrylate or triesters of (meth)acrylic acid and a tetrol such as pentaerythritol tri(meth)acrylate.

Further examples of such monomer(s) are obtained from the reaction of (meth)acrylic acid and a polyepoxide, such as the following formula:

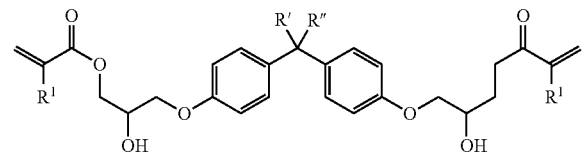

wherein $R^1$, R' and R'' are as defined for formula (I-a').

In an exemplary embodiment, in addition to the monomer(s) having at least two unsaturated C—C bonds (M2) and the monomer(s) having one unsaturated C—C bond and one hydroxyl group (MH), additional monomer(s) having exactly one unsaturated C—C bond (M1) may be used for the preparation for the hyperbranched copolymer (HBC).

Such monomers (M1) can include alkyl(meth)acrylates (M1'). Exemplary alkyl(meth)acrylates are esters of (meth)acrylic acids and alkyl alcohols having 1 to 16, for example, 1 to 9 carbon atoms. For example, alkyl(meth)acrylate (M1') can be selected from the group consisting of methyl(meth)acrylate, ethyl(meth)acrylate, butyl(meth)acrylate, cyclohexyl(meth)acrylate, hexyl(meth)acrylate, ethylhexyl (meth)-acrylate isobornyl(meth)acrylate, trimethylcyclohexyl(meth)acrylate, 2-ethylhexyl-(meth)acrylate.

For example, esters of (meth)acrylic acid of monoalcohols having hetero atoms, for example, in form of ether groups, are suitable as monomer(s) having unsaturated C—C bonds are monomers (M1), such as tetrahydrofurfuryl(meth)acrylate.

Styrene, butadiene or isoprene may be used in certain cases as monomers having one unsaturated C—C bond.

Exemplary monomers having unsaturated C—C bonds are acrylic acid, esters of acrylic acid, amides of acrylic acid, methacrylic acid, esters of methacrylic acid, amides of methacrylic acid.

The preparation of the hyperbranched copolymer (HBC) having OH groups is made in the presence of a cobalt (II) complex (CC). Such cobalt (II) complexes serve as Chain Transfer Catalyst (CTC). Examples of cobalt (II) complexes are cobalt (II) porphyrin complexes or those cobalt(II) chelates disclosed in U.S. Pat. No. 4,694,054, which is incorporated herein by reference in its entirety.

The cobalt (II) complex (CC) can be a cobaloxime.

Examples of the cobalt (II) complex (CC) are cobalt(II) complexes of formula (III) and (III'). An example of the cobalt (II) complex (CC) is a bis(borondifluoro-dimethylglyoximate) cobaltate (II) complex. This Co (II) complex may be represented by the following formula (III'):

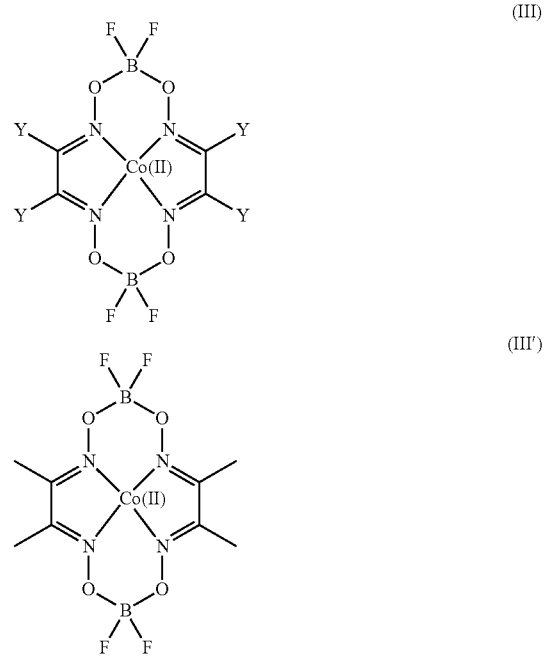

In formula (III), Y, independently, is phenyl or an alkyl group with 1 to 12 carbon atoms or Y and Y on adjacent carbon atoms, taken together, is an alkylene group with 4 to 6 carbon atoms or is a —CH═CH—CH═CH—.

There may additionally be some further ligands such as solvents or water attached to the central Co(II) atom, for example, leading to an octahedral structure, respectively pseudo-octahedral structure.

The synthesis of the bis(borondifluorodimethylglyoximate) cobaltate (II) complex (often also abbreviated as CoBF respectively COBF) is described in detail in A. Bakac et al., *J. Am. Chem. Soc.* 1984, 106, 5197-5202, which is incorporated herein by reference in its entirety.

The cobalt (II) complex (CC), for example, the bis(borondifluoro-dimethylglyoximate) cobaltate (II) complex, can be used in the preparation of the hyperbranched copolymer (HBC) in a concentration of less than 1% by weight, for example, less than 0.5% by weight, for example, of 0.001 to 0.1% by weight, relative to the weight of the monomers having unsaturated C—C bonds.

Details for the preparation of hyperbranched polymers (HBC) can be found in U.S. Pat. No. 4,880,889 and U.S. Pat. No. 5,767,211 which disclosures are hereby incorporated by reference in their entireties.

For example, the production of the hyperbranched polymers (HBC) is made in the presence of a non-peroxide initiator (IN). Examples are azo initiators such as 2,2'-azobis(2,4-dimethylvaleronitrile), 2,2-azobis-(4-methoxy-2,4-dimethylvaleronitrile), 2,2-azobis-(2,4-dimethylvaleronitrile), (1-phenyl-ethyl) azodiphenylmethane, 2,2-azobis-(isobutyronitrile), dimethyl 2,2-azobis-(isobutyrate), 2,2-azobis-(2-methylbutyronitrile), 1,1-azobis-(1-cyclohexane-carbonitrile), 2,2-azobis-(2,4,4-trimethyl pentane), 2,2-azobis-2-methylpropane), 2,2-azobis (N,N-dimethylene isobutyronidine)dihydrochloride, 2,2-azobis-(2-amidnopropane)dihydrochloride, 2,2-azobis-(N,N-dimethyleneisobutyronidine), 4,4-azobis-(4-cyanopentanoic acid) and 3,3-azobis-(3cyanobutyrsulfonic acid). An example of a non-peroxide initiator (IN) is 2,2-azobis-(isobutyronitrile) (AIBN).

In an exemplary embodiment, the hyperbranched copolymer (HBC) is prepared from:
a') one or more monomer(s) having at least two unsaturated C—C bonds (M2);
b') one or more monomer(s) having one unsaturated C—C bond (MH) and one hydroxyl group;
c') one or more monomer(s) having one unsaturated C—C bond (M1) in the presence of a non-peroxide initiator (IN) and the cobalt (II) complex (CC).

In an exemplary embodiment, the hyperbranched copolymer (HBC) is prepared from:
a") one or more di(meth)acrylate(s) (M2');
b") one or more hydroxyalkyl(meth)acrylate(s) (MH'); and
c") one or more alkyl(meth)acrylate(s) (M1')
in the presence of an azo initiator, for example, 2,2-azobis-(isobutyronitrile), and the cobalt (II) complex (CC).

For example, the hyperbranched copolymer (HBC) is prepared from 1-20% by weight, for example, 1.5-15% by weight, of di(meth)acrylate (M2'), related to the weight sum of di(meth)acrylate (M2') and Hydroxyalkyl(meth)acrylate(s) (MH') and alkyl(meth)acrylate(s) (M1');
10-45% by weight, for example, 15-35% by weight, of hydroxyalkyl(meth)-acrylate(s) (MH'), related to the weight sum of di(meth)acrylate (M2') and hydroxy-alkyl(meth)acrylate(s) (MH') and alkyl(meth)acrylate(s) (M1'); and
30-80% by weight, for example, 60-75% by weight, of alkyl (meth)acrylate(s) (M1'), related to the weight sum of di(meth) acrylate (M2') and hydroxyalkyl(meth)acrylate(s) (MH') and alkyl(meth)acrylate(s) (M1');
in the presence of an azo initiator, for example, 2,2-azobis-(isobutyronitrile), and the cobalt (II) complex (CC).

The polymerization reaction of the above composition(s) can be carried out at high temperatures (60-400° C.) by way of the addition of mixture of monomer(s)/CTC/initiator into a heated solvent at the above mentioned high temperatures. The product obtained can be a hyperbranched polymer in solution with relatively low viscosity and in high conversion of monomers (90-99%) with no gel. The resulting product, for example, the hyperbranched polyol in the solvent, can have a viscosity ranging from 3,000 to 18,000 mPa·s (cP) at 20° C. The hyperbranched copolymer (HBC) having OH groups may be purified. It may also be used as such. In said resulting product, respectively in the hyperbranched copolymer (HBC) having OH groups, there may remain some residuals of the cobalt (II) complex (CC).

For example, polymerizations can be conducted in 80% by weight butyl acetate solution, to which a mixture of 3.2% by weight of ethylene glycol dimethacrylate (EGDMA), 31% by weight of methylmethacrylate (MMA), 28% by weight of hydroxypropylmethacrylate (HPMA), 16% by weight of butylmethacrylate (BMA), 1.2% by weight of 2,2'-azobis (isobutyronitrile)(AIBN) and 45 ppm cobalt (II) complex (CC) is added over a period of time during which the temperature is maintained within 80-140° C. After the addition, the mixture can be stirred for a further period of time at above 60° C. until the reaction is finished. Sample is taken for $^1$H NMR analysis to assess the conversion of the unsaturated monomers. The resulting product can be cooled, filtered and ready to be used as a polyol component. The resulting product can contain hyperbranched polyol in butyl acetate and can have a viscosity ranging from 3,000 to 18,000 mPa·s (cP) at 20° C.

The first pack (C1) may also comprise further ingredients which are in the field of two component polyurethanes. Exemplary additional ingredients of the first pack are plasticizers, solvents, inorganic and organic fillers, catalysts, for example, for catalyzing the NCO/OH reaction, rheology modifiers, driers, adhesion promoters, stabilizers against heat, light and UV radiation, flame retardants, biocides, pigments or surface-active substances as for example wetting agents, flow control agents, de-aerating agents or defoamers.

It can be desirable to ensure that such additional ingredients do not adversely affect the stability of the first pack (C1) in storage. In an exemplary embodiment, this means that these ingredients do not give rise to any significant extent, in the course of storage, to reactions that lead, for example, to crosslinking. For example, these optional ingredients do not react with the other ingredients in said pack, for example, not with hyperbranched copolymer (HBC) having OH groups, or trigger some reaction of ingredients being present in the first pack.

The second pack (C2) (second component) comprises at least one polyisocyanate (PI).

In an exemplary embodiment, the polyisocyanate (PI) is a monomeric polyisocyanate (PI-M), for example, a monomeric diisocyanate or triisocyanate.

Said monomeric polyisocyanate may be an aromatic or an aliphatic polyisocyanate.

"Aromatic polyisocyanate" includes an organic compound which contains exclusively aromatic isocyanate groups. "Aromatic" identifies an isocyanate group which is attached to an aromatic or heteroaromatic radical. "Aliphatic polyisocyanate" identifies an organic compound which contains aliphatic isocyanate groups. "Aliphatic" identifies an isocyanate group which is attached to an aliphatic, cycloaliphatic or arylaliphatic radical.

Examples of suitable aromatic monomeric polyisocyanates include polyisocyanates such as 2,4- and 2,6-tolylene diisocyanate and any desired mixtures of these isomers (TDI), 4,4'-, 2,4'- and 2,2'-diphenylmethane diisocyanate and any desired mixtures of these isomers (MDI), 1,3- and 1,4-phenylene diisocyanate, 2,3,5,6-tetramethyl-1,4-diisocyanatobenzene, naphthalene-1,5-diisocyanate (ND1), 3,3'-dimethyl-4,4'-diisocyanatobiphenyl (TODI), dianisidine diisocyanate (DADI), 1,3,5-tris(isocyanatomethyl)benzene, tris(4-isocyanatophenyl)methane and tris-(4-isocyanatophenyl) thiophosphate.

Examples of suitable aliphatic monomeric polyisocyanates include polyisocyanates such as 1,4-tetramethylene diisocyanate, 2-methylpentamethylene 1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine diisocyanate and lysine ester diisocyanate, cyclohexane-1,3- and 1,4-diisocyanate, 1-methyl-2,4- and 2,6-diisocyanatocyclohexane and any desired mixtures of these isomers (HTDI or $H_6$TDI), 1-isocyanato-3,3,5-trimethyl-5-isocyanatomethylcyclohexane (=isophorone diisocyanate or IPDI), perhydro-2,4'- and 4,4'-diphenylmethane diisocyanate (HMDI or $H_{12}$MDI), 1,4-diisocyanato-2,2,6-trimethylcyclohexane (TMCDI), 1,3- and 1,4-bis(isocyanatemethyl)cyclohexane, m- and p-xylylene diisocyanate (m- and p-XDI), m- and p-tetramethyl-1,3-xylylene diisocyanate and -1,4-xylylene diisocyanate (m- and p-TMXDI), bis(1-isocyanato-1-methylethyl)naphthalene, dimer and trimer fatty acid isocyanates such as 3,6-bis(9-isocyanatononyl)-4,5-di-(1-heptenyl)cyclohexane (dimeryl diisocyanate) and $\alpha,\alpha,\alpha',\alpha',\alpha'',\alpha''$-hexamethyl-1,3,5-mesitylene triisocyanate.

In an exemplary embodiment, the polyisocyanate (PI) is an oligomeric polyisocyanate (PI-O) of the above mentioned monomeric polyisocyanates (PI-M).

Suitable oligomers of a monomeric diisocyanate include, for example, the oligomers of HDI, IPDI and TDI. For example, such oligomers usually constitute mixtures of substances having different degrees of oligomerization and/or chemical structures. They can have an average NCO functionality of 2.1 to 4.0 and can contain, for example, isocyanurate groups, iminooxadiazinedione groups, uretdione groups, urethane groups, biuret groups, allophanate groups, carbodiimide groups, uretonimine groups or oxadiazinetrione groups. They can have a low monomeric diisocyanate content. Commercially available products are, for example, HDI biurets, for example Desmodur® N 100 and Desmodur® N 3200 (from Bayer), Tolonate® HDB and Tolonate® HDB-LV (from Perstorp) and also Duranate® 24A-100 (from Asahi Kasei); HDI isocyanurates, examples being Desmodur® N 3300, Desmodur® N 3600 and Desmodur® N 3790 BA (from Bayer), Desmodur® N 3390 BA (from Bayer), Tolonate® HDT, Tolonate® HDT-LV and Tolonate® HDT-LV2 (from Perstorp), (Duranate® TPA-100 and Duranate® THA-100 (from Asahi Kasei) and also Coronate® HX (from Nippon Polyurethane); HDI uretdiones, an example being Desmodur® N 3400 (from Bayer); HDI iminooxadiazinediones, an example being Desmodur® XP 2410 (from Bayer); HDI allophanates, an example being Desmodur® VP LS 2102 (from Bayer); IPDI isocyanurates, examples being Desmodur® Z 4470 (from Bayer) and Vestanat® T1890/100 (from Evonik); TDI oligomers, an example being Desmodur® IL (from Bayer); and also mixed isocyanurates based on TDI/HDI, as for example Desmodur® HL (from Bayer).

In an exemplary embodiment, the polyisocyanate (PI) is a polyurethane polymer (PUP) containing isocyanate groups.

The term "polyurethane polymer" includes all polymers which are prepared by a diisocyanate polyaddition process. This also includes those polymers which are entirely or virtually free from urethane groups. Examples of polyurethane polymers are polyether-polyurethanes, polyester-polyurethanes, polyether-polyureas, polyureas, polyester-polyureas, polyisocyanurates and polycarbodiimides.

An exemplary polyurethane polymer (PUP) is obtainable, for example, from the reaction of at least one polyol with at least one polyisocyanate, for example, with a monomeric polyisocyanates (PI-M) and/or an oligomeric polyisocyanate (PI-O) being both mentioned above.

This reaction can involve the polyol and the polyisocyanate being reacted by customary methods, at temperatures, for example of 50° C. to 100° C., optionally with accompanying use of suitable catalysts, the amount of the polyisocyanate being such that its isocyanate groups are present in a stoichiometric excess in relation to the hydroxyl groups of the polyol. The amount of the polyisocyanate can be such that an NCO/OH ratio of 1.3 to 5, for example, of 1.5 to 3, is observed. The "NCO/OH ratio" means the ratio of the number of isocyanate groups used to the number of hydroxyl groups used. After the reaction of all of the hydroxyl groups of the polyol, the polyurethane polymer (PUP) can retain a free isocyanate group content of 0.5 to 15% by weight, for example, of 0.5 to 10% by weight.

Exemplary polyols which can be used for preparing a polyurethane polymer (PUP) include, for example, the following commercially customary polyols or mixtures thereof:

polyoxyalkylene polyols, also called polyether polyols or oligoetherols, which are polymerization products of ethylene oxide, 1,2-propylene oxide, 1,2- or 2,3-butylene oxide, oxetane, tetrahydrofuran or mixtures thereof, optionally polymerized by means of a starter molecule having two or more active hydrogen atoms, such as, for example, water, ammonia or compounds having two or more OH or NH groups, such as, for example, 1,2-ethanediol, 1,2- and 1,3-propanediol, neopentylglycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexane-dimethanol, bisphenol A, hydrogenated bisphenol A, 1,1,1-trimethylolethane, 1,1,1-trimethylolpropane, glycerol, aniline, and also mixtures of the aforementioned compounds. Use may be made not only of polyoxyalkylene polyols which have a low degree of unsaturation (measured in accordance with ASTM D-2849-69 and expressed in milliequivalents of unsaturation per gram of polyol (meq/g)), prepared, for example, by means of what are called double metal cyanide complex catalysts (DMC catalysts), but also of polyoxyalkylene polyols having a higher degree of unsaturation, prepared, for example, by means of anionic catalysts such as NaOH, KOH, CsOH or alkali metal alkoxides.

Exemplary are polyoxyalkylene diols or polyoxyalkylene triols, for example, polyoxyethylene and polyoxypropylene diols and triols.

Exemplary are polyoxyalkylene diols and triols having a degree of unsaturation of less than 0.02 meq/g and having a molecular weight in the range of 1000-30 000 g/mol, and also polyoxypropylene diols and triols having a molecular weight of 400-8000 g/mol.

Exemplary are what are called ethylene oxide-terminated ("EO-end capped", ethylene oxide-end capped) polyoxypropylene polyols. These are polyoxypropylene-polyoxyethylene polyols which can be obtained, for example, by further alkoxylating pure polyoxypropylene polyols, for example, polyoxypropylene diols and triols, with ethylene oxide after the end of the polypropoxylation reaction, and as a result can contain primary hydroxyl groups.

Styrene-acrylonitrile or acrylonitrile-methyl methacrylate-grafted polyether polyols can be employed.

Polyester polyols, also called oligoesterols prepared, for example, from dihydric to trihydric alcohols such as, for example, 1,2-ethanediol, diethylene glycol, 1,2-propanediol, dipropylene glycol, 1,4-butanediol, 1,5-pentanediol, 1,6-hexanediol, neopentylglycol, glycerol, 1,1,1-trimethylolpropane or mixtures of the aforementioned alcohols with organic dicarboxylic acids or their anhydrides or esters such as, for example, succinic acid, glutaric acid, adipic acid, suberic acid, sebacic acid, dodecanedicarboxylic acid, maleic acid, fumaric acid, phthalic acid, isophthalic acid, terephthalic acid and hexahydrophthalic acid or mixtures of the aforementioned acids, and also polyester polyols from lactones such as ε-caprolactone, for example, can be employed.

Polycarbonate polyols, of the kind obtainable by reaction, for example, of the abovementioned alcohols, those used to construct the polyester polyols, with dialkyl carbonates, diaryl carbonates or phosgene can be employed.

Block copolymers which carry at least two hydroxyl groups and which contain at least two different blocks with polyether, polyester and/or polycarbonate structure of the type described above can be employed.

Polyacrylate polyols and polymethacrylate polyols can be employed.

Polyhydrocarbon polyols, also called oligohydrocarbonols, such as, for example, polyhydroxy-functional ethylene-propylene, ethylene-butylene or ethylene-propylene-diene copolymers, of the kind produced, for example, by the company Kraton Polymers, or polyhydroxy-functional copolymers of dienes such as 1,3-butanediene or diene mixtures and vinyl monomers such as styrene, acrylonitrile or isobutylene, or polyhydroxy-functional polybutadiene polyols, such as, for example, those which are prepared by copolymerization of 1,3-butadiene and allyl alcohol and which may also have been hydrogenated can be employed.

Polyhydroxy-functional acrylonitrile/butadiene copolymers, of the kind preparable, for example, from epoxides or amino alcohols and carboxyl-terminated acrylonitrile/butadiene copolymers (available commercially under the name Hypro® CTBN from Hanse Chemie) can be employed.

These stated polyols can have an average molecular weight of 250-30,000 g/mol, for example, 400-20,000 g/mol, and, for example, can have an average OH functionality in the range from 1.6 to 3.

Exemplary polyols are polyether, polyester, polycarbonate and polyacrylate polyols, for example, diols and triols. Exemplary are polyether polyols, for example, polyoxypropylene polyols and polyoxypropylene-polyoxyethylene polyols.

Exemplary polyisocyanates (PI) include oligomeric polyisocyanate (PI-O) or monomeric polyisocyanates (PI-M).

For example, the polyisocyanate (PI) has a molecular weight of less than 700 g/mol, for example, between 400 and 670 g/mol.

For example, the polyisocyanate (PI) is selected from the group consisting of 1,6-hexamethylene diisocyanate (HDI), 1-isocyanato-3,3,5-trimethyl-5-isocyanatomethylcyclohexane (isophorone diisocyanate or IPDI), 2,4-toluene diisocyanate, 2,6-toluene diisocyanate and the isocyanurates or biurets or uretdiones thereof.

The second (C2) may also comprise further ingredients suitable for use in two-component polyurethanes. Exemplary additional ingredients of the second pack are plasticizers, solvents, inorganic and organic fillers, such as catalysts, for example, for catalyzing the NCO/OH reaction, rheology modifiers, driers, adhesion promoters, stabilizers against heat, light and UV radiation, flame retardants, biocides, pigments or surface-active substances as for example wetting agents, flow control agents, de-aerating agents or defoamers.

It can be desirable to ensure that such additional ingredients do not adversely affect the stability of the second pack (C2) in storage. For example, this can mean that these ingredients do not give rise to any significant extent, in the course of storage, to the reactions that lead, for example, to crosslinking. In an exemplary embodiment, the additional ingredients do not contain any water, or at most only traces of water. For example, it may be sensible to carry out chemical or physical drying of certain additions prior to their incorporation into the composition by mixing.

In an exemplary embodiment, these optional ingredients do not react with the other ingredients in said pack, for example, not with the polyisocyanate, or trigger some reaction of ingredients being present in the first pack.

As it is exemplary for the two part polyurethane composition to have low content of VOC (Volatile Organic Compounds), it is exemplary that the first and/or the second pack has a very low content of, for example, the complete absence of, solvent as additional ingredient in the two-part polyurethane composition.

The content of the first pack and the second pack C2) can be filled and stored in individual compartments, for example, packaging, to yield first pack (C1), and second pack (C2), respectively. Such compartments, for example, packaging, can be in the form of drums, pails, hobbocks, cartridge, bags, pouch, bucket or unipacks. The packaging, for example, respectively formed packs, may also be attached to each other, for example, in the form of twin cartridges (side-by-side arrangement) or cartridge-in-cartridge (co-central arrangement), which can be packs or packaging for two-part compositions.

In an exemplary embodiment, the first pack (C1) and the second pack (C2) as described are prepared separately from one another, and at least the second pack (C2) in the absence of moisture. The two packs (components) are stable in storage separately from one another at room temperature or slightly elevated temperature. For example, they can each be kept in a suitable packaging or facility such as, for example, in a drum, a hobbock, a pouch, a bucket or a cartridge, for a period of several months to a year or more prior to their application, without undergoing alteration in their respective properties to any extent relevant for their utility.

For using the two-part polyurethane composition the content of the first pack (C1) and the content of the second pack (C2) of the two-part polyurethane composition as disclosed above can be mixed.

The mixing ratio between the two packs (C1 and C2) can be selected in such a ratio, that the amount of polyisocyanate (PI) is present in such an amount that the ratio of the number hydroxyl groups being present in the first pack (C1) to the number of isocyanate groups in the second pack (C2) is a value between 0.9 and 1.1. This can assure a fairly complete curing of the mixed two-part polyurethane composition.

An exemplary two-part polyurethane composition can be broadly used, for example, as adhesive, sealant, primer, coating, paint or floor coating.

In an exemplary embodiment, disclosed is a coating which is obtained by a procedure comprising the steps:
i) mixing of the content of the first pack (C1) and the content of the second pack (C2) of a two-part polyurethane composition as described above in detail, resulting in a mixed two-part polyurethane composition;
ii) applying the mixed two-part polyurethane composition onto a substrate (S);
iii) curing of the mixed two-part polyurethane composition.

The mixing of the two components may be done in one embodiment by metering the amount of content of the first and second pack (C1 and C2) and mixing the two components by using a stirrer, a static or a dynamic mixer or by a twin-feed spray technique in order to achieve a mixing quality, for example, to achieve a level of mixing that is as high as possible. The metering can be done either manually or automatically such as a metering pump or by coupled movement of pistons such as in a twin cartridge system.

Mixing may take place continuously or batchwise. If mixing takes place prior to application, it can be desirable to ensure that the time which elapses between the mixing of the two components (C1 and C2) and the application is not too great, since otherwise there may be defects, such as a delayed or incomplete curing or incomplete development of adhesion to the surface of the solid, for example.

It has been observed that the mixed two-part polyurethane composition may exhibit relatively low viscosity in comparison with analogous formulations using polyols other than the hyperbranched copolymer (HBC) having OH groups being described above in detail. This can allow for, on the one hand, achieving better mixing quality, easier application or, on the other hand, achieving a higher amount of filler to be used which results in a less expensive formulation. Finally, lower viscosity can allow for better sprayability and better film quality.

The mixed two-part polyurethane composition can be applied manually or automatically, for example, by means of a robot. The application of the two-part polyurethane composition can occur, for example, in the form of a spray, of a bead, by pouring, brushing, coating, spreading, scraping, wiping or dipping.

In the above procedure, suitable substrates (S) can include, for example, inorganic substrates such as glass, glass ceramic, concrete, mortar, brick, tile, plaster, and natural stones such as granite or marble; metals or alloys such as aluminum, steel, nonferrous metals, galvanized metals; organic substrates such as leather, fabrics, paper, wood, resin-bound wood-based materials, resin-textile composites, plastics such as polyvinyl chloride (unplasticized and plasticized PVC), acrylonitrile-butadiene-styrene copolymers (ABS), SMC (sheet molding composites), polycarbonate (PC), polyamide (PA), polyesters, PMMA, polyesters, epoxy resins, polyurethanes (PUR), polyoxymethylene (POM), polyolefins (PO), for example, polyethylene (PE) or polypropylene (PP) surface-treated by plasma, corona or flames, ethylene/propylene copolymers (EPM) and ethylene/propylene-diene terpolymers (EPDM); coated substrates such as powder-coated metals or alloys; and also inks and paints, for example, automotive paints.

The substrates may, when desirable, be pretreated prior to application of the composition. Such pretreatments can include, for example, physical and/or chemical cleaning processes, such as abrading, sandblasting, brushing or the like, for example, or treatment with cleaners or solvents or the application of an adhesion promoter, an adhesion-promoter solution or a primer.

During and after application, the composition can begin to cure. It has been observed that the two-part polyurethane composition may cure very fast, for example, under heated conditions in comparison to linear acrylic polyol systems.

An exemplary two-part polyurethane composition can provide various benefits such as combining low viscosity, long pot life, fast cure, beneficial adhesion properties, excellent weathering, UV and chemical resistance. Furthermore, it can form excellent films. The visual aspect of those films such as color and gloss combined with good adhesion and scratch resistance and exceptional flexibility can be desirable, for example, when using a two-part polyurethane composition for preparation of coatings.

In view of the low viscous properties of the hyperbranched copolymer (HBC) having OH groups, also disclosed is the exemplary use of the hyperbranched copolymer (HBC) having OH groups of a two-part polyurethane composition as described above for a non-crystallizing curing agent for isocyanates. It can be desirable that such curing agents are non-crystallizing as this can increase the quality of mixing and the rate of curing.

Furthermore, disclosed is an exemplary method of reacting the hyperbranched copolymer (HBC) having OH groups of a two-part composition as described above with at least one polyisocyanate wherein the hyperbranched copolymer (HBC) is brought in physical contact with the polyisocyanate.

This contacting might be, for example, a simple or thorough mixing of the hyperbranched copolymer (HBC) and the polyisocyanate. In an exemplary embodiment where the hyperbranched copolymer (HBC), respectively a composition thereof, is applied in a small layer on one substrate surface, and where the polyisocyanate, respectively a composition thereof, is applied on another substrate surface, a reaction can occur between the hyperbranched copolymer (HBC) and the polyisocyanate by simply contacting the two surfaces with each other.

In an exemplary embodiment, the reaction between the hyperbranched copolymer (HBC) having OH and at least one polyisocyanate leads to a reaction product.

Depending on the ratio between the hydroxyl groups and the isocyanate groups, the reaction product can either exhibit some hydroxyl groups or some isocyanate groups.

If the reaction between the hyperbranched copolymer (HBC) having OH groups with at least one polyisocyanate is done in such a ratio that the number of NCO groups of the polyisocyanate to the number of OH groups of the hyperbranched copolymer (HBC) is <1, for example, less than 0.5, for example, 0.4-0.1, a relatively low viscous (despite the very high molecular weight) polyol having a very high OH functionality can be obtained, for example, being two hyperbranched polyol molecules being bridged by the polyisocyanate. Such polyols can be suitable for getting polyurethanes of very high mechanical strength, for example, high stiffness and high glass transition temperatures.

If the reaction between the hyperbranched copolymer (HBC) having OH groups with at least one polyisocyanate is done in such a ratio that the number of NCO groups of the polyisocyanate to the number of OH groups of the hyperbranched copolymer (HBC) is >1, a reaction product having NCO groups (HBC-NCO) can be obtained. Such reaction products represent a further exemplary aspect of the present disclosure. Exemplary are such polymers, in which all of the OH groups of the hyperbranched copolymer (HBC) are reacted by the polyisocyanates. However, it is exemplary that the polyisocyanate does not crosslink individual hyperbranched copolymers which would lead fast to very high molecular weight.

Such a reaction product having NCO groups (HBC-NCO) represent low viscous polyisocyanates having a very high NCO functionality and can be suitable for use as an efficient crosslinker in polyurethane systems. For example, they can yield polyurethane composition of extremely high mechanical properties, for example, high stiffness and high glass transition temperatures. Very unique properties are obtained in case if such a reaction product having NCO groups (HBC-NCO) is combined with polyurethane polymer (PUP) containing isocyanate groups which have been described above.

In such system a synergistic effect of the properties of the elastic part stemming from the polyurethane (PUP) and the stiff part stemming from the reaction product (HBC-NCO) can be achieved. For example, these reaction products having NCO groups (HBC-NCO) can be useful in the field of coatings, for example, powder coatings.

EXAMPLES

1. Raw Materials

TABLE 1

Raw materials (which were used as received without further treatment)

| Raw material | Supplier |
|---|---|
| Methyl methacrylate, ≥99.9% ('MMA') | Lucite |
| n-Butyl methacrylate, ≥99.5% ('n-BMA') | Evonik |
| Hydroxypropyl methacrylate, ≥98% ('HPMA') | Evonik |
| Ethylene glycol dimethacrylate, ≥99% ('EGDMA') | Evonik |
| 2-Mercapto ethanol, ≥99% | Aldrich |
| n-butyl acetate, ≥99.5% ('BuAc')) | Celanese |
| 2,2'-azobis(isobutyronitrile) (AIBN), Vazo 64 | DuPont |
| Cobalt(II) acetate tetrahydrate, AS reagent, ≥98.0% | Sigma-Aldrich |
| Dimethylglyoxime, ACS reagent, ≥99% | Sigma-Aldrich |
| Diethyl ether, ACS reagent, anhydrous, 99.7% | Sigma-Aldrich |
| Boron trifluoride diethyl etherate | Sigma-Aldrich |
| Joncryl ® 922 | Johnson Polymer |
| G-Cure ® 192 | Cognis |
| Synocure 852 BA80 ('Synocure 852') n-butyl acetate | Cray Valley |
| Tinuvin ® 1130 (UV absorber) | BASF |
| Tinuvin ® 292 (hindered amine light stabilizer, HALS) | BASF |
| 10% Dibutyl tin dilaurate (DBTL) in BuAc | |
| Desmodur ® N 3390 BA (Aliphatic polyisocyanate (HDI trimer) (90% in BuAc) | Bayer Material Science |

Preparation of Hyperbranched Polyol Using 2-Mercaptoethanol as Chain Transfer Catalyst: HP-Ref.

3.380 kg (3.380 mole) of methyl methacrylate, 1.020 kg (7.075 mole) of hydroxypropyl methacrylate, 1.000 kg (7.032 mole) n-butyl methacrylate, 0.800 kg (4.040 mole) of ethylene glycol dimethacrylate, 0.840 kg (10.769 mole) of 2-mercaptoethanol, 0.500 kg of n-butyl acetate and 0.160 kg (0.974 mole) 2,2'-azobis(isobutyronitrile) were charged into a 10-liter preparation vessel and the mixture de-gassed by bubbling nitrogen through for 30 minutes with gentle agitation. 1.500 kg of n-butyl acetate was charged into a 10-liter reaction vessel equipped with a condenser, a 4-bladed propeller stirrer and $N_2$ inlet and heated to above 80° C. With agitation, the monomer mixture made in the preparation vessel was charged into the reaction vessel using a peristaltic pump over 45 minutes during which the temperature was maintained between 80 and 150° C. The mixture was stirred for a further 2 hours during which the temperature was maintained above 80° C. A mixture of 0.424 kg (4.24 mole) of MMA, 0.285 kg (1.9768 mole) of HPMA, 0.035 kg (0.246 mole) of n-BMA, 0.032 kg (0.162 mole) of EGDMA and 0.200 kg of n-butyl acetate made previously was then charged into the reaction vessel at 80° C. at which the reaction mixture was stirred for a further hour. The reaction mixture was allowed to cool to 60° C. and a clear, viscous product obtained by filtering through a 50 micron bag. The viscosity at 20° C. was 8200 mPa·s (cP) with a solids content of 78-82%.

Preparation of Cobalt (II) Complex: CC-1

The synthesis has been made according to A. Bakac et al., *J. Am. Chem. Soc.* 1984, 106, 5197-5202, as described below:

To a 1 liter flask was added 40 grams of cobalt(II) acetate tetrahydrate and 600 ml of anhydrous diethyl ether. The mixture was stirred and 40 grams of dimethylglyoxime was added. The mixture was refluxed during stirring for two hours followed by the drop wise addition of boron trifluoride diethyl etherate. The mixture was stirred under refluxing overnight. The product was filtered and washed with 20 ml of cold de-ionized water three times and dried under vacuum at room temperature. 36.5 gram of bis(borondifluorodimethylglyoximate) cobaltate (II) have been obtained and has been abbreviated as CC-1 for further use.

Preparation of Hyperbranched Polyol Using Cobalt (II) Complex CC-1 as Chain Transfer Catalyst: HPC-1

Into a 350-liter reaction vessel was charged 60.00 kg of n-butyl acetate. With slow agitation nitrogen was bubbled through the liquid at 2 liter/minute for 30 minutes. The solvent was then heated and maintained at above 80° C. Into the header tank was charged 72.00 kg of hydroxypropyl methacrylate, 8.00 kg of ethylene glycol dimethacrylate, 10.00 kg of n-butyl acetate, 40.00 kg of n-butyl methacrylate, 80.00 kg of methyl methacrylate and 3.00 kg of AIBN. After the AIBN was fully dissolved, nitrogen was passed through the solution at 2 liter/minute for 30 minutes. A solution of 12 g of the above cobalt (II) complex CC-1 in 2 liter acetone was added into the monomer solution and was stirred until the solution was homogenous. The monomer solution was charged over 45 minutes into the reaction vessel under agitation while the temperature was maintained at between 80-150°. The mixture was stirred for a further two hours and the reaction temperature maintained above 80° C. After the reaction, 20 liters of solvent was distilled out under reduced pressure. The product was filtered through a 50 micron bag to give a clear pale viscous liquid having the solids of 78%, a viscosity of 12000 mPa·s(cP) at 20° C. and an OH content of 4.2%.

Preparation of Two-Part Polyurethane Compositions

Two part polyurethane compositions were prepared in the following manner using the ingredients in the amounts of Table 2.

The first part (component) were formed by mixing the polyol into the solvent followed by adding the Tinuvin® additives and the tin catalyst.

Catalyst levels are slightly different in order to make pot life and cure rates comparable.

The Desmodur® N 3390 BA was used as second part (component).

To the first part 33.4 g of the second part was added and mixed by a propeller stirrer to yield a total amount of mixed composition indicated in Table 2.

The example Ref. 1 is a reference example using a hyperbranched polyol using a mercapto compound as chain transfer catalyst. The reference examples Ref. 2 to Ref. 5 all use different traditional acrylic polyols being commercially available. All acrylic polyols are at 80% solids in butyl acetate.

TABLE 2

Two-part compositions

| | 1 | Ref. 1 | Ref. 2 | Ref. 3 | Ref. 4 |
|---|---|---|---|---|---|
| HPC-1 [g] | 75 | | | | |
| HP-Ref. [g] | | 75 | | | |
| Joncryl ® 922 [g] | | | 75 | | |
| G-Cure ® 192 [g] | | | | 75 | |
| Synocure 852 [g] | | | | | 75 |
| n-butyl acetate [g] | 30 | 30 | 30 | 30 | 30 |
| Tinuvin ® 1130 [g] | 0.45 | 0.45 | 0.45 | 0.45 | 0.45 |

TABLE 2-continued

| | \multicolumn{5}{c}{Two-part compositions} | | | | |
|---|---|---|---|---|---|
| | 1 | Ref. 1 | Ref. 2 | Ref. 3 | Ref. 4 |
| Tinuvin ® 292 [g] | 0.45 | 0.45 | 0.45 | 0.45 | 0.45 |
| 10% DBTL in BuAc [g] | 0.20 | 0.18 | 0.08 | 0.20 | 0.20 |
| Desmodur ® N 3390 BA [g] | 33.4 | 33.4 | 33.4 | 38.8 | 32.6 |
| Total [g] | 139.56 | 139.56 | 139.48 | 138.66 | 131.17 |
| NCO:OH | 1.05 | 1.05 | 1.05 | 1.05 | 1.05 |
| Solvent [%] | 35 | 35 | 35 | 35 | 35 |

Properties of the Two-Part Compositions

Viscosity:

The viscosity of the compositions was measured directly after mixed by the determination of the flow time by use of flow cups. For the present test BS 3900 A6 No. 4 flow cups (according to ISO 2431) were used at room temperature for the mixed compositions and the flow time indicated in seconds in Table 3.

Pot Life:

The initial viscosity ($\eta_0$) was measured (in seconds) using the above flow cup method directly after mixing. Further measurements of viscosity ($\eta_x$) were undertaken after different times ($t_x$) after mixing. As pot life that time was identified for which the viscosity ($\eta_x$) is the double (in seconds) of the initial viscosity ($\eta_0$). Long pot life is always useful for formulators for the convenience of application.

Hardness:

Films of mixed compositions were casted (100 micron wet film thickness) using a 100 micron draw down bar (Sheen Wire Bar Coater 1120/25/100) on a Q-Panel (A-36 aluminium panels (76×152×0.625 mm) supplied by Q-Lab). The solvent was allowed to evaporate in a fume cupboard for 30 minutes before being cured in the oven (80° C.) for 5 minutes, as well as 30 minutes, or in air (at room temperature) for 6 hours, as well as 24 hours, as well as 7 days. The hardness of the films was measured using a Persoz pendulum hardness test equipment. A measure for the hardness was hence the time (in seconds) of swinging amplitude to decrease from 12° to 4°.

UV-Stability:

The UV-stability was assessed by means of QUV-A weathering stability test method. For the test, Q-panels coated with the respective PU films as described above (Hardness) were used. The panels were allowed to cure for at least 21 days before subjecting to QUV test.

All two-part compositions were subjected to accelerated weathering tests. The ASTM G154-04 cycle 3 was used in the accelerated QUV-A weathering stability test. The cycle involved an 8-hour UV radiation at 70° C. and a 4-hour water condensation at 50° C.

After 1000 h testing the samples were assessed in view of coloring. Yellowing is a measure for UV-instability. Furthermore, the gloss was measured before ("Original Gloss") and after the 1000 h QUA-V test exposure. The retention of gloss (in %) is taken as a measure of UV-stability. The gloss of the films has been measured with An Elcometer® 407 Statistical Glossmeter. The gloss was measured at three angles of reflection 20°, 60° and 85°. The higher the retention the better is the UV-stability.

Retention of gloss=(Gloss after 1000 h QUV-A)/Original Gloss

The values measured as discussed above are compiled in Table 3.

Flexibility and Adhesion:

The flexibility and adhesion was measured using the Conical bending test in the following matter: The Q-Panels coated by the fully cured polyurethane film as described above (Hardness) were bent to 120° and the film around the bending edge was observed. If a peeling of the film has been detected the adhesion and flexibility were both rated "poor". If cracks of the film have been detected the flexibility has been rated "poor". If no peeling off the film nor cracks have been observed adhesion and flexibility were rated "good".

TABLE 3

| | \multicolumn{5}{c}{Properties of two-part compositions} | | | | |
|---|---|---|---|---|---|
| | 1 | Ref. 1 | Ref. 2 | Ref. 3 | Ref. 4 |
| Viscosity [s] | 37 | 33 | 45 | 50 | 55 |
| Pot life [min.] | 60 | 80 | 45 | 50 | 50 |
| Hardness | | | | | |
| Hardness 5 min at 80° C. [s] | 31 | 153 | 13 | 18 | 18 |
| Hardness 30 min at 80° C. [s] | 288 | 280 | 220 | 286 | 177 |
| Hardness 6 hr at 23° C. [s] | 29 | 61 | 19 | 20 | 18 |
| Hardness 24 hr at 23° C. [s] | 136 | 132 | 190 | 232 | 142 |
| Hardness 7 day at 23° C. [s] | 271 | 285 | 256 | 296 | 320 |
| 1000 h QUV Retention of gloss | | | | | |
| Gloss measured at 20° [%] | 98 | 56 | 68 | 70 | 80 |
| Gloss measured at 60° [%] | 98 | 63 | 81 | 80 | 96 |
| Gloss measured at 85° [%] | 98 | 67 | 94 | 98 | 96 |
| Colour | None | None | Yellow | Yellow | Yellow |
| Adhesion | Good | Good | Poor | Poor | Poor |
| Flexibility | Good | Good | Poor | Poor | Poor |

The results in Table 3 show that example 1 and Ref. 1 had the lowest viscosities of all the systems tested. As discussed before, low viscosity can be desirable from both application and low VOC points of view.

It can be also seen that Ref. 1 formulation had the longest pot life while example 1 had the second longest pot life. Considering the lower starting viscosities, in case of example 1 and Ref. 1, the time until they have reached the same viscosity level than the other examples is even longer, resulting in a much longer workability.

The results from Table 3 also show that the example 1 has a much higher flexibility and adhesion that those examples formulated with traditional polyols (Ref. 2-Ref. 4).

The values of hardness show that example 1 and Ref. 1, despite the extended pot-life, develop very fast a high hardness that as well at 80° C. (Hardness 5 min at 80° C.) as at room temperature (Hardness 6 hr at 23° C.) as compared to the composition using the comparative polyols. The hardness obtained on long term curing is, however, more or less at a comparable level.

It is also visible from Table 3, that example 1 and Ref. 1 remain clear and do not exhibit yellowing. However, in comparing example 1 and Ref. 1 it is clearly visible from the data that Ref. 1, i.e., the formulation based on the hyperbranched polyol prepared by means of mercapto compound as chain transfer catalyst, exhibits for all angles measured much lower gloss retention values as compared to example 1 according to an exemplary aspect which is a clear measure that Ref. 1 has much lower UV resistance than example 1.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A two-part polyurethane composition, comprising a first pack (C1) and a second pack (C2), wherein
the first pack (C1) comprises:
at least one hyperbranched copolymer (HBC) having OH groups, wherein the at least one hyperbranched copolymer is prepared from at least
a) one or more monomer(s) having at least two unsaturated C—C bonds (M2), and
b) one or more monomer(s) having one unsaturated C—C bond and one hydroxyl group (MH),
in the presence of a cobalt (II) complex (CC), and
the second pack (C2) comprises at least one polyisocyanate (PI),
wherein the first pack (C1) and the second pack (C2) are separate packs, and contents of the first pack (C1) are stored separately from contents of the second pack (C2),
wherein the at least one hyperbranched copolymer (HBC) is not prepared from a mercapto compound-containing chain transfer agent.

2. The two-part polyurethane composition according to claim 1, wherein the cobalt (II) complex (CC) is a bis(borondifluorodimethylglyoximate) cobaltate (II) complex.

3. The two-part polyurethane composition according to claim 1, wherein the hyperbranched copolymer (HBC) is prepared from:
a) the one or more monomer(s) having at least two unsaturated C—C bonds (M2),
b) the one or more monomer(s) having one unsaturated C—C bond and one hydroxyl group (MH), and
c) one or more monomer(s) having one unsaturated C—C bond (M1),
in the presence of a non-peroxide initiator (IN) and the cobalt (II) complex (CC).

4. The two-part polyurethane composition according to claim 1, wherein the hyperbranched copolymer (HBC) is prepared from:
a'') one or more di(meth)acrylate(s) (M2'),
b'') one or more hydroxyalkyl(meth)acrylate(s) (MH'), and
c'') one or more alkyl(meth)acrylate(s) (M1'),
in the presence of an azo initiator and the cobalt (II) complex (CC).

5. The two-part polyurethane composition according to claim 4, wherein the hyperbranched copolymer (HBC) is prepared from:
1-20% by weight of the di(meth)acrylate (M2'), related to the weight sum of di(meth)acrylate (M2') and hydroxyalkyl(meth)acrylate(s) (MH') and alkyl(meth)acrylate(s) (M1');
10-45% by weight of the hydroxyalkyl(meth)acrylate(s) (MH'), related to the weight sum of di(meth)acrylate (M2') and hydroxyalkyl(meth)acrylate(s) (MH') and alkyl(meth)acrylate(s) (M1')
and
30-80% by weight of the alkyl(meth)acrylate(s) (M1'), related to the weight sum of di(meth)acrylate (M2') and hydroxyalkyl(meth)acrylate(s) (MH') and alkyl(meth)acrylate(s) (M1');
in the presence of an azo initiator and the cobalt (II) complex (CC).

6. The two-part polyurethane composition according to claim 4, wherein the di(meth)acrylate is an (poly)alkylene or (poly)oxyalkylene bridged di(meth)acrylate.

7. The two-part polyurethane composition according to claim 4, wherein the di(meth)acrylate is of formula (I-a) or (I-b):

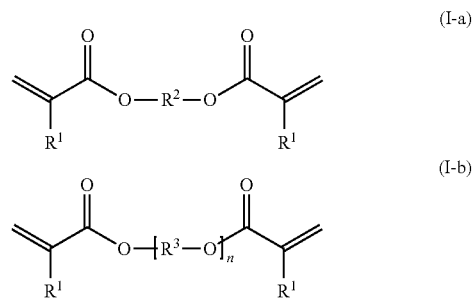

wherein $R^1$ is H or a methyl group;
$R^2$ is a linear or branched alkylene group with 2 to 30 carbon atoms;
$R^3$ is a linear or branched alkylene group with 2 to 6 carbon atoms and n is an integer from 2 to 6.

8. The two-part polyurethane composition according to claim 3, wherein the hydroxyalkyl(meth)acrylate has the formula (II):

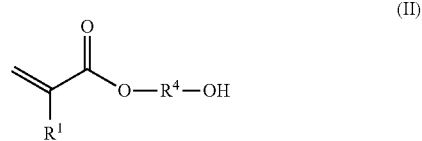

wherein $R^1$ is H or a methyl group, and $R^4$ is a linear or branched alkylene group of 1 to 10 carbon atoms.

9. The two-part polyurethane composition according to claim 1, wherein the cobalt (II) complex (CC) is used in the preparation of the hyperbranched copolymer (HBC) in a concentration of less than 1% by weight, relative to the weight of the monomers having unsaturated C—C bonds.

10. The two-part polyurethane composition according to claim 1, wherein the polyisocyanate (P1) has a molecular weight of less than 700 g/mol.

11. The two-part polyurethane composition according to claim 1, wherein the polyisocyanate (PI) is selected from the group consisting of 1,6-hexamethylene diisocyanate (HDI), 1-isocyanato-3,3,5-trimethyl-5-isocyanatomethylcyclohexane (isophorone diisocyanate or IPDI), 2,4-toluene diisocyanate, 2,6-toluene diisocyanate and the isocyanurates or biurets or uretdiones thereof.

12. The two-part polyurethane composition according to claim 1, wherein the amount of polyisocyanate (PI) is present in such an amount that a ratio of a number hydroxyl groups present in the first pack (C1) to a number of isocyanate groups present in the second pack (C2) is a value between 0.9 and 1.1.

13. A method of forming a coating, the method comprising:
i) mixing the content of the first pack (C1) and the content of the second pack (C2) of the two-part polyurethane composition according to claim 1, resulting in a mixed two-part polyurethane composition;
ii) applying the mixed two-part polyurethane composition onto a substrate (S); and
iii) curing the mixed two-part polyurethane composition.

14. The two-part polyurethane composition according to claim 1, wherein the hyperbranched copolymer (HBC) having OH groups is a non-crystallizing curing agent for isocyanates.

15. The method according to claim 13, wherein the step of mixing the content of the first pack (C1) and the content of the second pack (C2) results in the hyperbranched copolymer (HBC) being brought into physical contact with the polyisocyanate.

16. The two-part polyurethane composition according to claim 1, wherein a ratio of a number of NCO groups of the polyisocyanate to a number of OH groups of the hyperbranched copolymer (HBC) is greater than 1.

17. The two-part polyurethane composition according to claim 4, wherein the azo initiator includes 2,2-azobis-(isobutyronitrile).

18. The two-part polyurethane composition according to claim 4, wherein the hyperbranched copolymer (HBC) is prepared from:
1.5-15% by weight of the di(meth)acrylate (M2'), related to the weight sum of di(meth)acrylate (M2') and hydroxyalkyl(meth)acrylate(s) (MH') and alkyl(meth)acrylate(s) (M1');
15-35% by weight of the hydroxyalkyl(meth)acrylate(s) (MH'), related to the weight sum of di(meth)acrylate (M2') and hydroxyalkyl(meth)acrylate(s) (MH') and alkyl(meth)acrylate(s) (M1');
and
60-75% by weight of the alkyl(meth)acrylate(s) (M1'), related to the weight sum of di(meth)acrylate (M2') and hydroxyalkyl(meth)acrylate(s) (MH') and alkyl(meth)acrylate(s) (M1');
in the presence of an azo initiator and the cobalt (II) complex (CC).

19. The two-part polyurethane composition according to claim 7, wherein the di(meth)acrylate is of formula (I-a) or (I-b), wherein $R^2$ is a linear or branched alkylene group with 2 to 15 carbon atoms.

20. The two-part polyurethane composition according to claim 7, wherein the di(meth)acrylate is of formula (I-a) or (I-b), wherein $R^2$ is an ethylene, propylene, isopropylene or butylene group.

21. The two-part polyurethane composition according to claim 8, wherein the hydroxyalkyl(meth)acrylate has the formula (II), wherein $R^1$ is a methyl group, and $R^4$ is a methylene or ethylene or propylene or butylene group.

22. The two-part polyurethane composition according to claim 1, wherein the cobalt (II) complex (CC) is used in the preparation of the hyperbranched copolymer (HBC) in a concentration of less than 0.5% by weight, relative to the weight of the monomers having unsaturated C—C bonds.

23. The two-part polyurethane composition according to claim 1, wherein the cobalt (II) complex (CC) is used in the preparation of the hyperbranched copolymer (HBC) in a concentration of 0.001 to 0.1% by weight, relative to the weight of the monomers having unsaturated C—C bonds.

24. The two-part polyurethane composition according to claim 1, wherein the polyisocyanate (P1) has a molecular weight of between 400 and 670 g/mol.

25. The two-part polyurethane composition according to claim 1, wherein a ratio of a number of NCO groups of the polyisocyanate to a number of OH groups of the hyperbranched copolymer (HBC) is greater than 2.

26. The two-part polyurethane composition according to claim 1, wherein a ratio of a number of NCO groups of the polyisocyanate to a number of OH groups of the hyperbranched copolymer (HBC) is 2.5-10.

27. The two-part polyurethane composition according to claim 1, wherein the first pack (C1) comprising the at least one hyperbranched copolymer (HBC) having OH groups, has a viscosity ranging from 3,000 to 18,000 mPa·s at 20° C.

28. The two-part polyurethane composition according to claim 1, wherein the second pack (C2) does not contain water.

29. A two-part polyurethane composition, comprising a first pack (C1) and a second pack (C2), wherein
the first pack (C1) comprises:
at least one hyperbranched copolymer (HBC) having OH groups, wherein the at least one hyperbranched copolymer is prepared from at least
a) one or more monomer(s) having at least two unsaturated C—C bonds (M2), and
b) one or more monomer(s) having one unsaturated C—C bond and one hydroxyl group (MH),
in the presence of a cobalt (II) complex (CC), and
the second pack (C2) comprises at least one polyisocyanate (PI),
wherein the first pack (C1) and the second pack (C2) are separate packs, and contents of the first pack (C1) are stored separately from contents of the second pack (C2),
wherein the hyperbranched copolymer (HBC) is prepared from:
a) the one or more monomer(s) having at least two unsaturated C—C bonds (M2),
b) the one or more monomer(s) having one unsaturated C—C bond and one hydroxyl group (MH), and
c) one or more monomer(s) having one unsaturated C—C bond (M1),
in the presence of a non-peroxide initiator (IN) and the cobalt (II) complex (CC).

30. A two-part polyurethane composition, comprising a first pack (C1) and a second pack (C2), wherein
the first pack (C1) comprises:
at least one hyperbranched copolymer (HBC) having OH groups, wherein the at least one hyperbranched copolymer is prepared from at least
a) one or more monomer(s) having at least two unsaturated C—C bonds (M2), and
b) one or more monomer(s) having one unsaturated C—C bond and one hydroxyl group (MH),
in the presence of a cobalt (II) complex (CC), and
the second pack (C2) comprises at least one polyisocyanate (PI),
wherein the first pack (C1) and the second pack (C2) are separate packs, and contents of the first pack (C1) are stored separately from contents of the second pack (C2),
wherein the amount of polyisocyanate (PI) is present in such an amount that a ratio of a number hydroxyl groups present in the first pack (C1) to a number of isocyanate groups present in the second pack (C2) is a value between 0.9 and 1.1.

\* \* \* \* \*